Figure 1:
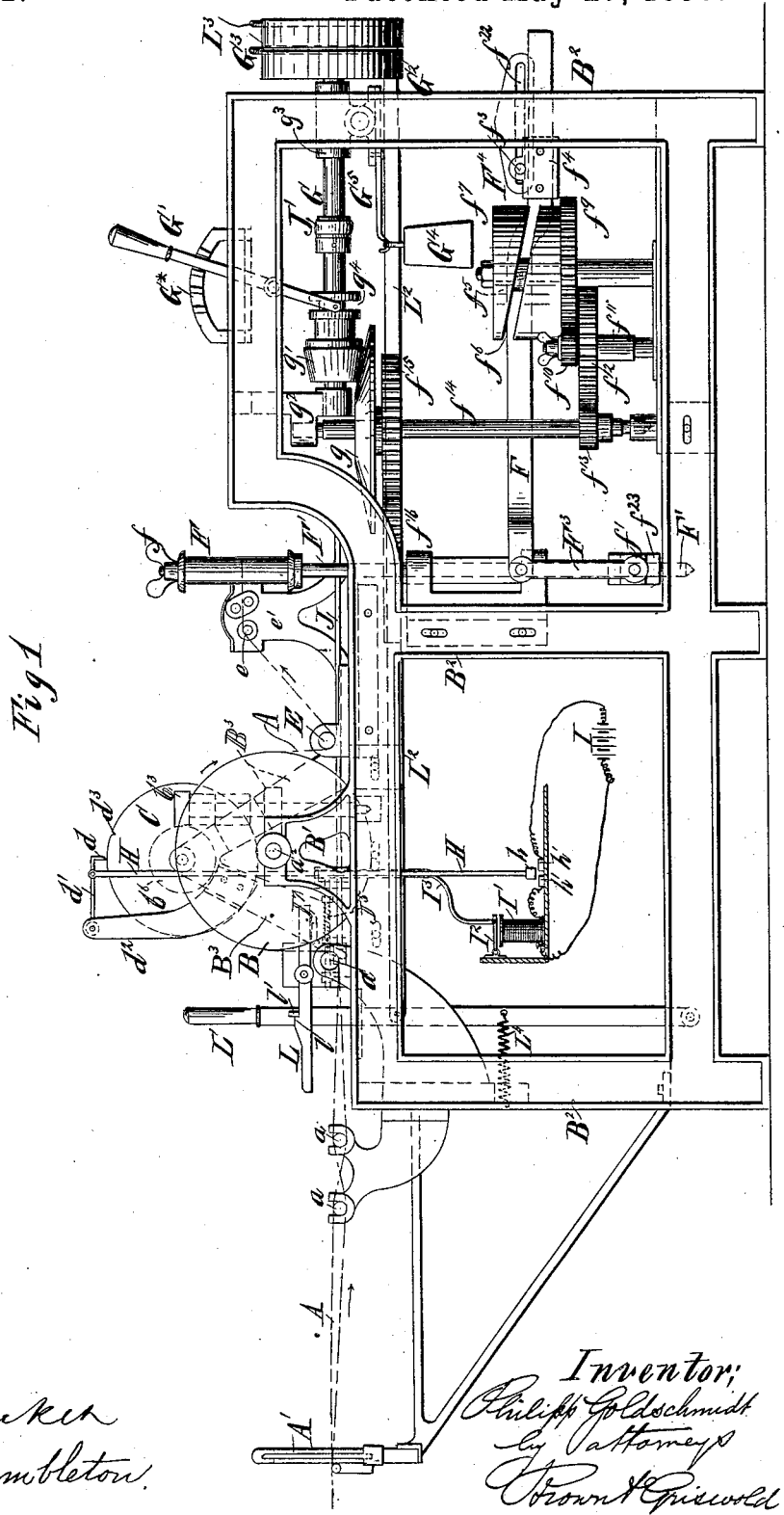

(No Model.) 4 Sheets—Sheet 1.

P. GOLDSCHMIDT.
WARPING MACHINE.

No. 428,772. Patented May 27, 1890.

Witnesses
John Bicker
Kate E. Pembleton

Inventor:
Philipp Goldschmidt
by attorneys
Brown & Griswold

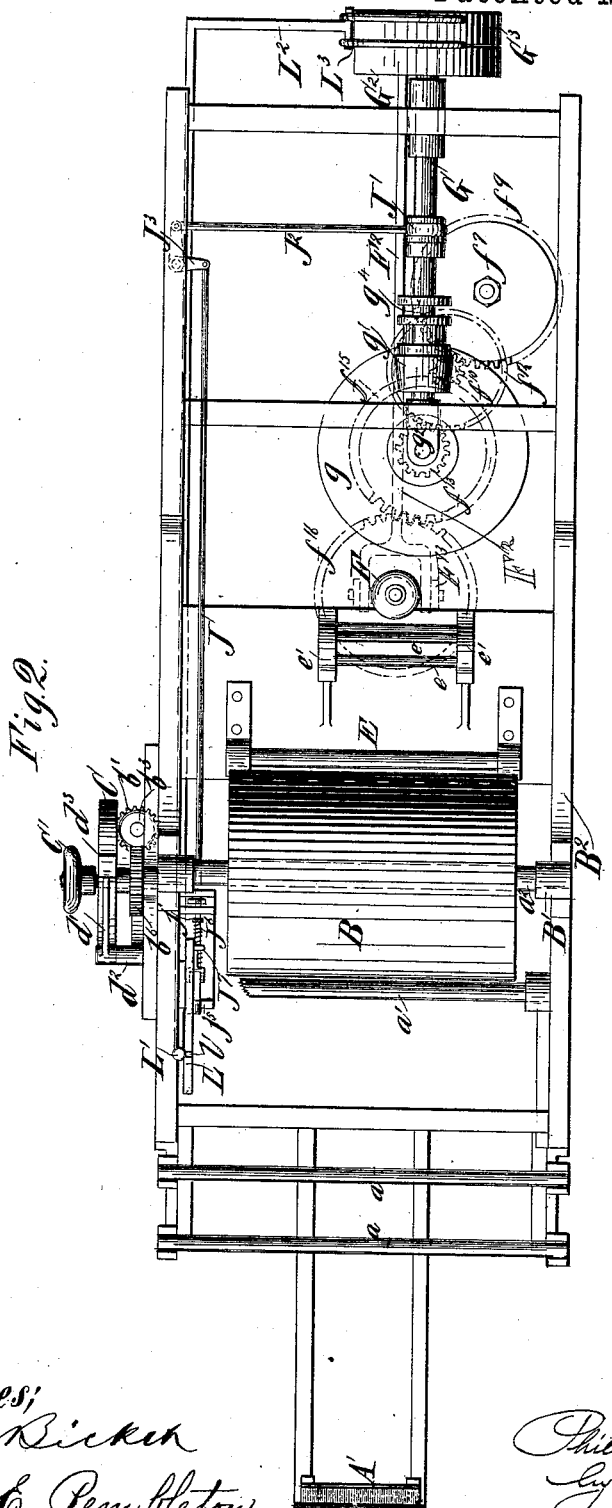

(No Model.) 4 Sheets—Sheet 3.
P. GOLDSCHMIDT.
WARPING MACHINE.
No. 428,772. Patented May 27, 1890.
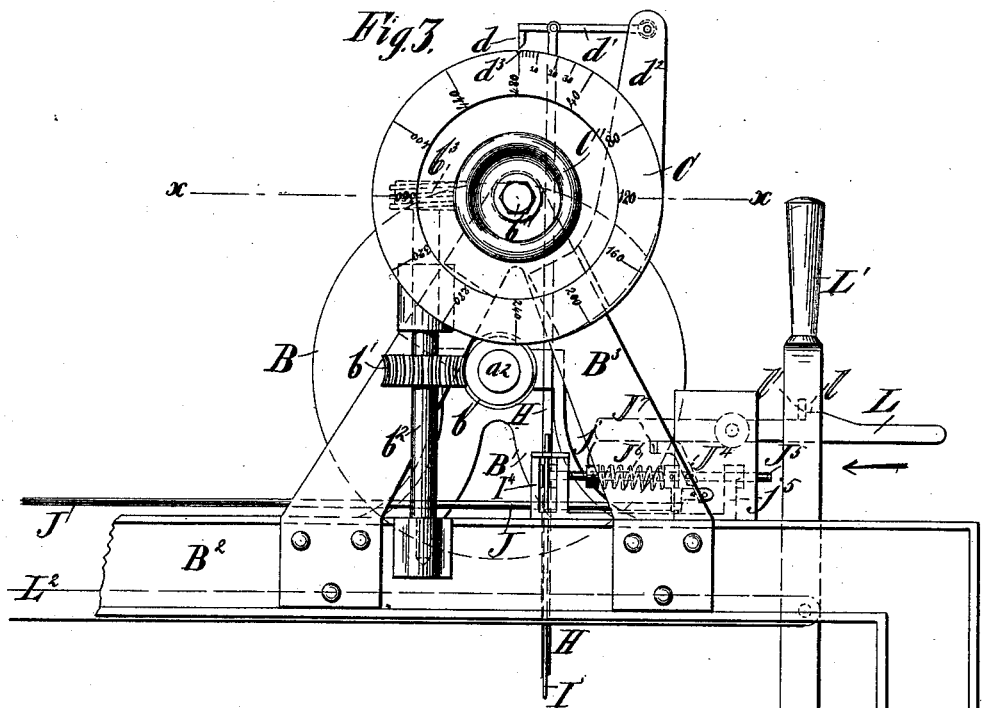
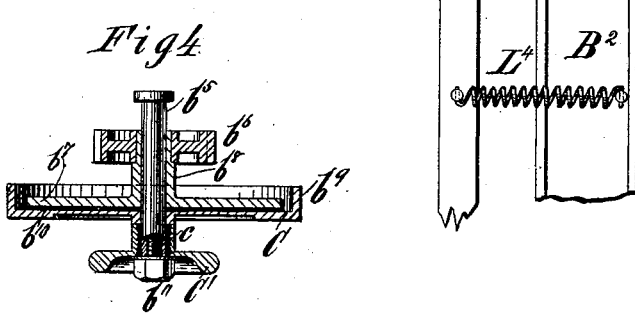
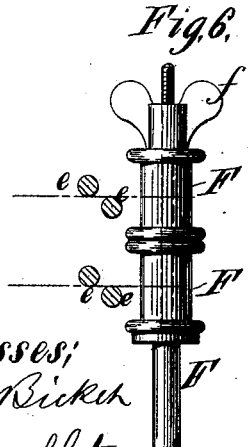
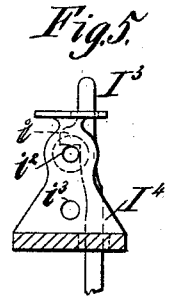
Witnesses:
John Bicker
K. E. Pembleton
Inventor:
Philipp Goldschmidt
by attorneys
Brown & Griswold (No Model.) 4 Sheets—Sheet 4.
P. GOLDSCHMIDT.
WARPING MACHINE.
No. 428,772. Patented May 27, 1890.
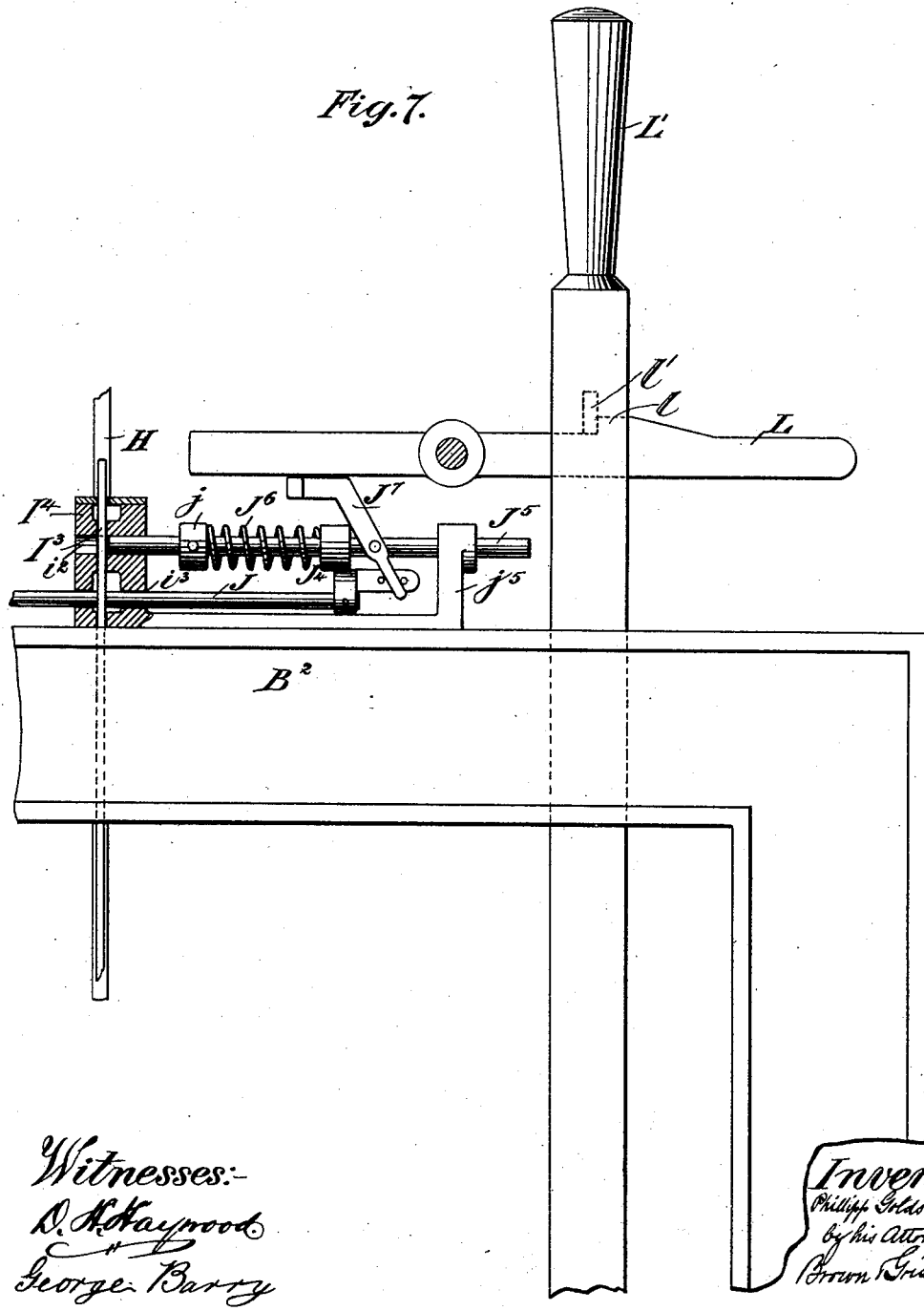

UNITED STATES PATENT OFFICE.

PHILIPP GOLDSCHMIDT, OF PATERSON, NEW JERSEY.

WARPING-MACHINE.

SPECIFICATION forming part of Letters Patent No. 428,772, dated May 27, 1890.

Application filed July 29, 1889. Serial No. 319,094. (No model.)

*To all whom it may concern:*

Be it known that I, PHILIPP GOLDSCHMIDT, of Paterson, in the county of Passaic and State of New Jersey, have invented a certain new and useful Improvement in Warping-Machines, of which the following is a specification.

My improvement relates to machines employed for warping, and is particularly adapted to the warping of silk.

I will describe my improvement in detail, and then point out the novel features in claims.

In the accompanying drawings, Figure 1 is a side elevation of a machine embodying my improvement. Fig. 2 is a plan or top view of the same. Fig. 3 is a side elevation, on an enlarged scale, of a portion of the machine, looking from the opposite side to that shown in Fig. 1. Fig. 4 is a horizontal section of the indicator shown in Fig. 3, taken on line $xx$. Fig. 5 is a detail of a certain portion of a stop mechanism which may be employed, and looking in the direction of the arrow, Fig. 3. Fig. 6 is a detail of a modification which may be employed. Fig. 7 is a detail view, on an enlarged scale, of a portion of a stop-motion which I employ.

Similar letters of reference designate corresponding parts in all the figures.

In carrying out my improvement I take the threads from an ordinary creel in the usual manner, and after passing them through a reel deliver them onto a horizontally-arranged drum. After leaving the drum they pass to a vertically-arranged spool. In passing over the drum they cause the rotation of the latter by friction. The drum drives indicator mechanism by which the number of yards passing to the spool are measured. The spool has a reciprocating motion imparted to it and may be rotated with various speeds. When the spool has been properly filled, a stop-motion operates to stop the machine.

I will first describe the passage of the thread to and over the drum and the operation of the indicator mechanism.

A thread A is delivered to a reed A' from a creel of ordinary construction (not shown) and in the usual manner. It passes after leaving the reed over glass rods $a$. Alternate threads pass over and under said rods, so as to cross each other in a well-known manner. From the rods $a$ the threads pass beneath a rod $a'$ and thence onto and over the drum B. The drum B is journaled, as at $a^2$, in brackets B', extending upwardly from the frame $B^2$ of the machine. The threads in their passage over the drum impart rotary motion thereto by friction.

Upon the shaft of the drum is mounted a worm $b$, which worm meshes with a worm-wheel $b'$, mounted in a vertically-extending shaft $b^2$, journaled in the frame $B^2$, and also in a bracket $B^3$, extending upwardly from said frame. The upper end portion of the shaft $b^2$ carries a worm $b^3$, which worm meshes with a worm-wheel $b^6$, mounted upon a shaft $b^5$, journaled in the bracket $B^3$.

On the shaft $b^5$, as shown more clearly in Fig. 4, is loosely mounted a disk $b^7$, provided with a hub $b^8$ surrounding said shaft. The worm-wheel $b^6$ is keyed upon said hub, and therefore when rotated imparts rotary motion to the disk $b^7$ about the shaft $b^5$, which latter is a stub-shaft.

C designates an indicator-dial. This dial is scored upon its face and near its periphery to indicate the number of yards of thread which it is desired to wind upon a spool. This dial is loosely mounted on the shaft $b^5$. It is, as shown, provided with a flange $b^9$, which incloses the disk $b^7$. I prefer to arrange between the disk $b^7$ and the dial C a washer of leather or similar material $b^{10}$.

C' designates a hollow clamping-nut having a screw-threaded engagement with a boss $c$ upon the shaft $b^5$. This clamping-nut may be rotated to force the dial C into close contact with the washer $b^{10}$, or with the disk $b^7$ should the washer be omitted. The dial will then rotate by frictional contact with the disk $b^7$ when the latter is rotated. A set-screw $b^{11}$, engaging the outer end of the shaft $b^5$, may be employed to maintain the clamping-nut in position.

The figures indicating yards upon the indicator-dial number, in the example of my improvement shown, from zero to 480. Assuming that it is desired to place three hundred and sixty yards upon the spool, the clamping-nut C' is loosened and the indicator-dial is rotated from zero progressively toward the number 360 and until said number is opposite a given point. In this instance such point is a toe $d$ on a lever $d'$, which lever is fulcrumed upon a bracket $d^2$, extending upwardly from the bracket $B^3$. The toe $d$ occupies a position vertically directly over the dial. At the zero-point on the dial is a notch $d^3$. The dial having been set, as described, and the machine put in operation, the dial rotates toward the zero-point, and when it reaches the zero-point the toe $d$ will drop into the notch $d^3$, which will result in operating a stop-motion for the machine, to be presently described. The driving mechanism between the drum B and the indicator-dial is so timed that the rotation of the drum will deliver only the desired number of yards of warp onto the spool that is provided for in the adjustment of the dial.

I will now describe the spindle for holding the spool upon which the warp is wound and the means for operating the same. The warp after leaving the drum passes beneath a glass rod E, and thence between other horizontal glass rods $e$, mounted in suitable brackets $e'$, extending upwardly from the bed of the machine. After leaving the said rods it passes directly onto a spool F. Said spool F, as shown in the example of my improvement illustrated in Fig. 1, comprises a continuous barrel with the ordinary heads. It is mounted upon a vertical spindle $F'$, and is clamped thereon so as to rotate therewith by means of a thumb-nut $f$. The spindle $F'$, and consequently the spool F, have a vertical reciprocating motion imparted to them, whereby the warp is wound evenly upon the spool from end to end, as required.

I wish to observe that by passing the warp-threads over the horizontally-arranged drum, and thence between horizontally-arranged rods, and thus to a vertically-arranged spool, the threads have no chance to "stray" or become uneven in tension, and the warp, when delivered upon the spool, is kept in an even compact condition. This is due to the fact that the warp after leaving said rods is turned or deflected, so that it is delivered from the horizontal and in a vertical plane.

I have shown means for imparting a vertical reciprocation to the spindle $F'$, consisting of a lever $F^2$, which lever is bifurcated, the end portions of the bifurcations being pivotally connected with links $F^3$, which latter are pivotally connected near their lower ends with a ring $f$, loosely fitting in a collar $f^{23}$, rigidly secured upon the lower portion of the spindle $F'$. The lever $F^2$ is fulcrumed in a bracket $F^4$, which bracket is secured upon a portion of the frame of the machine. Said bracket is provided with a horizontally-extending slot $f^{22}$, into which slot extends a pin $f^3$, as here shown, mounted upon a sleeve $f^4$, surrounding the lever $F^2$ and secured thereto. Upon the lever $F^2$ is a roller or bowl $f^5$, which roller or bowl extends into an inclined cam-groove $f^6$, formed circumferentially in a cam-wheel $f^7$. When the cam-wheel $f^7$ is rotated, the cam-groove $f^6$, acting upon the roller or bowl $f^5$, will cause the lever $F^2$ to be swung up and down, and thus cause a vertical reciprocation of the spindle and spool.

It is sometimes desirable to vary the degree of reciprocation of the spindle and spool. This may be accomplished either by varying the position which the roller or bowl $f^5$ will occupy on the lever $F^2$, so as to vary the point of application of power, or by shifting the fulcrum of the lever. This latter may be accomplished by loosening the sleeve $f^4$ and sliding it along upon the lever, so as to vary the position which the fulcrum-pin $f^3$ will occupy in the slot $f^2$.

The cam-wheel $f^7$ is mounted upon a vertically-extending shaft $f^8$. Upon said shaft and secured to the cam-wheel is a gear-wheel $f^9$, which gear-wheel meshes with a pinion $f^{10}$, mounted upon a shaft $f^{11}$, upon which shaft is also mounted a gear-wheel $f^{12}$, deriving motion from a gear-wheel $f^{13}$, mounted upon a vertically-extending shaft $f^{14}$, journaled in suitable bearings in the frame. The shaft $f^{14}$ has upon it another gear-wheel $f^{15}$, which gear-wheel meshes with a gear-wheel $f^{16}$, having a sliding or feathered connection with the spindle $F'$. Rotary motion imparted to the shaft $f^{14}$ therefore not only causes the rotary motion of the spindle $F'$, but also results through the intermediate mechanism in imparting vertical reciprocation to said spindle.

I have shown friction-gearing for transmitting motion to the shaft $f^{14}$. This friction-gearing comprises a disk $g$ on the shaft $f^{14}$ and a friction-wheel $g'$ on a horizontally-extending main or driving shaft G. The shaft G near one end has a loose bearing in a bracket $g^2$, extending downwardly from the frame of the machine. Near its other end it is journaled in a bearing $g^3$, pivoted upon the frame of the machine. This construction admits of a vertical rocking movement of the shaft G.

The friction-wheel $g'$ has a feathered or sliding connection with the shaft G, so that it may be moved nearer to or farther from the axis of rotation of the disk $g$. By thus moving it the speed of rotation of the spindle and the reciprocation thereof may be varied as desired, as by moving the wheel $g'$ nearer to the center of the disk $g$ the speed will be increased, and by moving it outwardly or toward the periphery of the friction-disk $g$ the speed will be decreased.

I have shown a convenient means for shifting the wheel $g'$, consisting in a lever $G'$, fulcrumed in the frame of the machine, and provided near its lower end with a yoke which engages an annular groove $g^4$, formed on the hub of the wheel $g'$. The lever $G'$ may engage notches in a lock-bracket $G^\times$, secured upon the frame of the machine, so as to maintain the wheel $g'$ in any position into which it may be adjusted. Of course the hub of the wheel $g'$ rotates freely in the yoke of the lever.

Rotary motion is imparted to the shaft G by means of a belt passing over a fast pulley $G^2$ on the shaft. Upon said shaft also is a loose pulley $G^3$.

I have shown a weight $G^4$ supported from the bearing $g^3$. The weight $G^4$ operates to rock the shaft downward, so as to force the friction-wheel $g'$ always into close contact with the disk $g$.

I have shown an electrically-operating stop-motion for stopping the machine when the proper quantity of warp has been received upon the spool. When the toe $d$ upon the lever $d'$ drops into the notch at the zero-point on the dial C, a rod H, suspended from said lever, also falls. Upon the lower end of said rod is a circuit-closer $h$. This circuit-closer, when the rod H falls, contacts with two contact-pieces $h'$ in a local circuit controlled by a battery I. Circuit is thus closed upon an electro-magnet $I'$, thus energizing the magnet. When the magnet is energized, an armature $I^2$ is attracted. To the armature $I^2$ is connected a rod $I^3$. The rod $I^3$, as shown more clearly in Fig. 5, is provided near its upper end with a projection $i$. Said rod may slide vertically in suitable bearings in an upright $I^4$. The upright $I^4$ is provided with two transversely-extending apertures $i^2$ $i^3$.

Referring more particularly to Figs. 2, 3, and 7, J designates a rod adapted to move to and fro through the aperture $i^3$ in the upright $I^4$. Longitudinal movement is imparted to the rod J from an eccentric $J'$ on the shaft G by means of an eccentric-rod $J^2$, one end of which connects with one arm of a bell-crank lever $J^3$, and the other arm of which has connected to it the rod J. The bell-crank lever $J^3$ is fulcrumed upon the frame $B^2$. The other end of the rod J is connected by means of a clamp $J^4$ to a rod $J^5$, which rod is adapted to be moved to and fro through the opening $i^2$ in the upright $I^4$, and also through a suitable opening in a bracket $j^5$, extending upwardly from the frame $B^2$. The clamp $J^4$ has a loose connection with the rod $J^5$, so that it may, under certain circumstances, slide upon said rod. It is caused, however, to impart longitudinal movement to the rod $J^5$ by a spring $J^6$, which surrounds the rod $J^5$ and is interposed between the clamp $J^4$ and a collar $j$ upon the rod $J^5$. The resistance of this spring is such that when the passage of the rod $J^5$ is unobstructed through the aperture $i^2$ in the upright $I^4$ the clamp $J^4$ will cause longitudinal movement of the rod $J^5$. When the armature $I^2$ is attracted, as has been described, and the rod $I^3$ is brought downward, the projections $i$ thereof will be brought opposite the aperture $i^2$, and thus prevent longitudinal movement of the rod $J^5$. A continued reciprocation of the rod J is, however, permitted, owing to the spring $J^6$.

Pivoted upon the rod $J^5$ is a lever $J^7$, which lever has a loose connection near its lower end, as shown, being held between pins, with the clamp $J^4$. When the rods J $J^5$ are reciprocating in unison, this lever moves with the rods; but when the movement of the rod $J^5$ has been stopped the lever $J^7$ is, by the movement of the rod J, rocked upon its fulcrum. It then operates to raise one end of a trip L, provided with a tooth $l$, engaging a projection $l'$ upon a lever $L'$. The lever $L'$ is fulcrumed near the base of the frame $B^2$, and has connected to it one end of a belt-shifter rod $L^2$, which belt-shifter rod carries at its other end a belt-shifter $L^3$, by which the belt may be shifted from the fast or loose pulley, or vice versa. In the operation just described the belt is shifted to the loose pulley, and the machine is therefore instantly stopped. The movement of the lever in one direction or in the direction to stop the machine is facilitated by a spring $L^4$, connected thereto and to the frame $B^2$. The machine is again started by rotating the dial C sufficiently to raise the toe $d$ out of the notch $d^3$, and again operating the lever $L'$ to engage it with the trip L.

I sometimes desire to wind warps for selvages on this machine, and to do that I employ two spools F, as shown more clearly in Fig. 6, placing one above the other upon the spindle $F'$, and substitute two sets of rods $e$, through each of which a selvage-warp passes and is guided to each of the spools F. By this means both selvage-warps may be wound simultaneously and separately and with no more difficulty than is incident to the winding of a simple warp.

Any kind of suitable stop-motion may be employed which will stop the machine upon the breaking of single warp-threads at the creel from which they are delivered. Such stop-motions are in common use and do not need description or illustration here.

What I claim as my invention, and desire to secure by Letters Patent, is—

1. In a warping-machine, the combination, with a horizontally-arranged rotary drum over which the warp-threads pass, of a vertically-arranged spindle for a spool adapted to receive the warp, and rods intermediate of the spindle and drum over which the warp-threads pass, substantially as specified.

2. In a warping-machine, the combination, with a horizontally-arranged rotary drum over which the warp-threads pass, of a vertically-arranged spindle for a spool adapted to receive the warp, and horizontally-arranged rods intermediate of the spindle and drum over which the warp-threads also pass, substantially as specified.

3. In a warping-machine, the combination, with a horizontally-arranged rotary drum over which the warp-threads pass, of a vertically-arranged spindle for a spool adapted to receive the warp, and mechanism, substantially such as described, for imparting a vertical reciprocation to said spindle and spool, substantially as specified.

4. In a warping-machine, the combination, with a vertically-arranged spindle, of friction-gearing for imparting rotary motion to said spindle, one member of said friction-gearing being movable upon the other to vary the speed of rotation of the spindle, a lever for effecting the movement of the movable member, and a weight for forcing said movable member always into contact with the other member, substantially as specified.

5. In a warping-machine, the combination, with a horizontally-arranged drum over which the warp-threads pass, of a vertically-arranged spindle and two sets of rods for delivering and guiding two different warps onto spools upon the spindle, substantially as specified.

PHILIPP GOLDSCHMIDT.

Witnesses:
FREDK. HAYNES,
KATE E. PEMBLETON.